United States Patent [19]

Kruse et al.

[11] Patent Number: 4,845,465
[45] Date of Patent: Jul. 4, 1989

[54] MULTIPLEXED D.C. ELECTRICAL SYSTEMS FOR AUTOMOTIVE VEHICLES

[75] Inventors: James W. Kruse, New Haven; Donald E. Riley, Fort Wayne, both of Ind.; W. Eric Windle, Antwerp, Ohio

[73] Assignee: Navistar International Transportation Corp., Chicago, Ill.

[21] Appl. No.: 149,456

[22] Filed: Jan. 28, 1988

[51] Int. Cl.4 .......................... B60Q 1/26; B60Q 1/34
[52] U.S. Cl. .................................... 340/468; 315/246; 307/10.8
[58] Field of Search ............... 340/74, 76, 81 R, 81 F, 340/83, 93, 95; 315/77, 246, 200 R, 205; 307/10 LS, 10 R; 362/61

[56] References Cited

U.S. PATENT DOCUMENTS

| | | | |
|---|---|---|---|
| 3,648,105 | 3/1972 | Sanford | 315/237 |
| 3,665,207 | 5/1972 | Sieber | 307/106 |
| 3,732,540 | 5/1973 | Platte | 340/76 |
| 3,829,830 | 8/1974 | Scarpino | 340/81 R |
| 3,883,845 | 5/1975 | DeVita | 340/67 |
| 3,893,041 | 1/1975 | Foster et al. | 331/45 |
| 3,940,657 | 2/1976 | Kasiewicz et al. | 315/77 |
| 4,078,188 | 3/1978 | Martin et al. | 313/579 |
| 4,097,782 | 6/1978 | Chambliss | 315/246 X |
| 4,114,071 | 9/1978 | Thrower, Jr. et al. | 315/226 |
| 4,155,069 | 5/1979 | Mason | 340/81 R |
| 4,306,218 | 12/1981 | Leconte et al. | 340/66 |
| 4,309,639 | 1/1982 | Thrower, Jr. et al. | 315/82 |
| 4,322,715 | 3/1982 | Moon | 340/81 R |
| 4,594,571 | 6/1986 | Neuhaus et al. | 340/52 F |
| 4,670,736 | 6/1987 | Ulrich | 340/81 R |
| 4,751,431 | 6/1988 | Ducote | 340/81 X |

Primary Examiner—Joseph A. Orsino
Assistant Examiner—Brian R. Tumm
Attorney, Agent, or Firm—F. David Aubuchon; Dennis K. Sullivan

[57] ABSTRACT

In a "two-wire" multiplexed lighting system, a square wave voltage alternating between positive and negative polarities is delivered by the two wires to both right and left lamps. Each lamp includes a diode, and the diodes are oppositely pulled with respect to each other so that one of the lamps is energized by one polarity of the square wave while the other lamp is energized by the opposite polarity. The magnitude of each polarity relative to ground is twice the continuous D.C. voltage rating of each lamp so that the average voltage applied to each lamp can be equal to the load's maximum continuous rating to thereby provide full intensity illumination. The lamps provide different signaling functions, such as turn signal, emergency warning, brake lamp and running lamp signals by the operation of corresponding command switches acting through a control logic circuit, including multiplexing, configured to assign a priority to the commands such that the highest priority command will override any others and produce the corresponding operation of a lamps. In the "three-wire" embodiment of a multiplexed vehicle lighting system, the two lamps have a common ground but each is supplied by its own individual wire. The control circuit further includes a novel circuit for performing the marker lamp function that is commonly used in large trucks and highway tractors.

37 Claims, 8 Drawing Sheets

MULTIPLEXED D.C. ELECTRICAL SYSTEMS FOR AUTOMOTIVE VEHICLES

BACKGROUND AND SUMMARY OF THE INVENTION

This invention relates generally to multiplexed D.C. electrical systems. More specifically, the invention relates to the multiplexing of electrical voltage to electrical loads in automotive vehicles, such as trucks and highway tractors.

Known automotive electrical technology includes proposals for various forms of multiplex systems. These systems have a number of documented advantages. One of the principal advantages is a reduction in the aggregate amount of wiring in a vehicle. Another advantage is that the current capacities of switching devices which control the flow of power to associated electrical loads can be significantly reduced in comparison to a non-multiplex system where the switching devices must be able to carry the full load current of their associated loads. Similar current-rating reductions can be made in many of the electrical connectors. State-of-the-art multiplex systems incorporate electronic control circuitry, often microprocessor-based, for performing the multiplex control functions. The added expense of such control circuitry is justified by advantages, such as those just mentioned. Corollary benefits of D.C. multiplex systems may include improved diagnostics, better reliability, and longer useful lives for electrical components.

Evolution of automotive electrical systems has resulted in increased voltage power supplies. The old 6-volt system has been essentially obsoleted in favor of today's prevailing 12-volt system. The ever-increasing use of electrical devices in vehicles imposes further demands on prevailing system voltage, and obsolescense of the 12-volt system is a real possibility in the future.

Fundamental principles of electric power distribution recognize that for a given wattage, increased efficiencies can be obtained by delivery of that power at higher voltage. While it is generally true that most electrical load devices can be designed for any given system voltage, the adaptation of certain types of electrical load devices for higher voltage operation may be accompanied by certain adverse consequences on them. One load device which may be adversely affected is the incandescent lamp which is designed for automotive vehicle usage. While it is certainly possible to fabricate a 24-volt continuous D.C. incandescent lamp, concerns have been expressed about the ability of the filament to attain life expectancies comparable to those of existing 12-volt lamp filaments. Because of the extensive use of incandescent lamps in automotive vehicles, particularly trucks and highway tractors, such concerns must be addressed in order to take advantage of the benefits of both higher voltage and multiplex systems in these vehicles.

One aspect of the present invention relates to a novel electrical system for adapting 6 and/or 12-volt D.C. incandescent lamps for use in a 24-volt D.C. electrical system so that the established life expectancies for such lamps can be anticipated in an automotive vehicle lighting system operated from such an increased voltage supply.

Another aspect of the invention relates to a multiplex system for multiplexing a given D.C. supply voltage to an electrical load whose continuous D.C. voltage rating is at most essentially one-half that of the supply. As applied to an automotive vehicle electrical lighting system, the invention adapts existing 6 and/or 12-volt D.C. incandescent lamps to a 24-volt D.C. supply in a manner which enables various standard signaling functions to be performed in novel and unique ways.

One series of embodiments of the invention is of a "two-wire" type system; another series, of a "three-wire" type system. The embodiments are disclosed in a highway tractor lighting system to perform running (park/tail/marker) light, stop (brake) light, turn signal, marker interrupt, and hazard warning functions. A single lamp, or single lamp load, can be used to perform these signaling functions because they are prioritized according to a pre-assigned priority.

Within the generic principles of the invention, further, and more specific, inventive features are found in the particular circuit embodiments which will be described in detail. Although the particular circuit embodiments illustrated in the several drawing figures are of electrical lighting systems, principles of the invention extend to certain electrical systems other than electrical lighting systems.

The foregoing features, advantages, and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

DESCRIPTION OF THE PREFERRED EMBODIMENT

Figure 1:
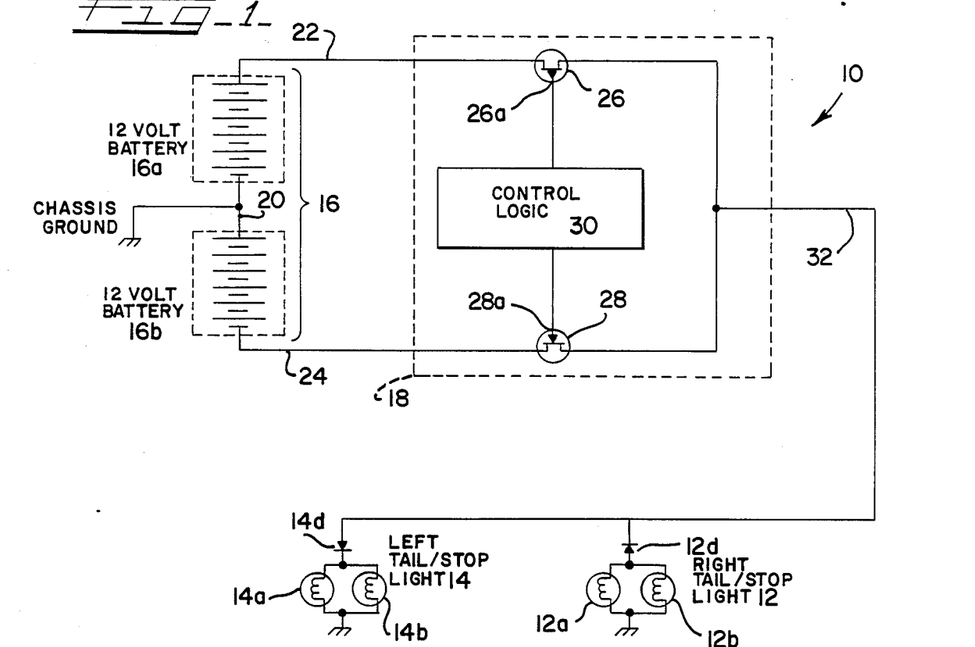
FIG. 1 is a schematic block diagram of a two-wire type system embodying principles of the invention.

FIG. 1 illustrates a two-wire, electrical lighting system 10 according to the invention. The system is for the right and left tail/stop lamps, 12 and 14 respectively, of an automotive vehicle, such as a highway tractor. The right lamp 12 is shown, by example, to comprise two individual lamp bulbs, 12a, 12b, in parallel, forming a single lamp load; similarly, the left lamp 14 has two bulbs 14a, 14b, in parallel, also forming a single lamp load. It is to be understood that this is a representative embodiment. Each lamp load is rated for 6-volt D.C. continuous operation and when so energized delivers rated illumination at rated power.

The power supply is schematically depicted by the numeral 16 to comprise two 12-volt batteries, 16a, 16b, in series. Power supply 16 is coupled to the lamp loads 12, 14 by means of a multiplex control 18.

In an automotive vehicle, the chassis and body are electrical ground. In FIG. 1 the conventional ground symbol indicates the point of ground connection for the lamp loads and for the power supply. The common connection 20 between the two batteries 16a, 16b, is at ground so that the two batteries in effect may be described as a 24-volt power supply endowed with a grounded center tap at connection 20 so as to provide a positive 12-volt potential at connection 22 (positive terminal of battery 16a), and a negative 12-volt potential at connection 24 (negative terminal of battery 16b).

Multiplex control 18 comprises a pair of controlled conduction switchs 26, 28, and a control logic 30 for operating switches 26, 28. Each switch 26, 28, has a main controlled conduction path whose conductivity is controlled by a control signal supplied to a corresponding control input 26a, 28a. The two control inputs 26a, 28a, are connected to respective outputs of control logic 30. The main controlled conduction path of switch 26 couples the positive terminal of battery 16a with a wire 32 which feeds the ungrounded side of both lamp loads 12, 14. The main controlled conduction path of switch 28 couples the negative terminal of battery 16b with wire 32.

However, the ungrounded sides of the respective lamp loads do not connect directly to wire 32; rather each lamp load 12, 14 connects through a corresponding diode 12d, 14d to wire 32, and the two diodes are oppositely poled in their respective connections to wire 32. For load 12, it is the cathode of diode 12d which connects to wire 32 while for load 14, it is the anode of diode 14d which connects to wire 32. In the vehicle, the diodes are preferably physically located in the respective lamps so that each lamp load is served (1) by the single wire 32 and (2) by ground—hence, the characterization as a "two-wire" system.

Control logic 30 comprises means for imposing up to a maximum 50% duty of operation on each switch 26, 28 with the respective duty cycles mutually exclusive. For example if only switch 26 is operated at 50% duty cycle, a positive 12-volt square wave signal is created at wire 32, meaning a signal whose maximum is positive 12-volts and whose minimum is zero volts. Since diode 14d favors conduction for each 12-volt half-cycle of such a square wave, lamp 14 will be impressed with a 12-volt square wave (less diode and line drops), whereby the average value of voltage delivered to the lamp will be essentially 6-volts, the continuous D.C. rating of the bulbs. By operating the switch at a sufficiently high frequency, the lamp will present an appearance of continuous full illumination to the human eye without any apparent fluctuations in intensity, virtually the same as it would if energized with continuous 6-volts D.C. Because diode 12d is oppositely poled, the positive 12-volt square wave on wire 32 cannot illuminate lamp 12.

In analogous manner, if switch 28 only is operated at 50% duty cycle, and at a similar sufficiently high frequency, lamp 12 will illuminate with the appearance of continuous full intensity. What is now a negative 12-volt square wave, meaning one which swings between zero and negative 12-volts, is coupled through diode 12d to illuminate lamp 12, while diode 14d prevents conduction through lamp 14.

Because control logic 30 renders the two switches 26, 28 conductive in a mutually exclusive manner, the concurrent duty cycling of both switches will cause the positive 12-volt and the negative 12-volt square waves to be 180 degrees out of phase, whereby the composite voltage waveform which appears on line 32 for this conduction will also be a square wave, but one which swings back and forth between positive 12-volts and negative 12-volts. This mode of operation will cause both lamps 12, 14 to continuously illuminate at full rated intensity. Where the bulbs are the type commonly known as stop lamp bulbs and energized in this way when the vehicle's service brakes are applied, such continuous full rated intensity of illumination represents a stop signal.

If both switches are continuously duty cycled in mutually exclusive manner by control logic 30, but at duty cycles reduced from the 50% maximum, there will be a corresponding reduction in average voltage applied to their respective lamp loads 12, 14. By an appropriate reduction in duty cycle (a 30% duty cycle for example), the lamps will dim from full rated intensity of illumination to a lesser level of illumination indicative of a tail lamp signal.

Hence, by particular modes of operation of switches 26, 28 from control logic 30, it is possible to produce different modes of signaling by lamps 12, 14. In addition to the two examples just described (i.e., stop lamp, tail lamp), right turn signal, left turn signal, hazard warning, and marker interrupt signals may be given.

For a right turn signal, switch 28 is periodically operated at 50% duty cycle at a periodic frequency corresponding to the desired flashing rate. For example, a succession of one second intervals each consisting of a half second of 50% duty cycle operation followed by a half second of 0% duty cycle operation will produce half second bursts of full intensity illumination at a frequency of one cycle per second. Operation of switch 26 in analogous manner will produce a left hand turn signal of similar characteristic. For turn signal functions, control logic 30 receives appropriate command signals from the turn signal switch (not shown in FIG. 1) in accordance with operation thereof by the driver of the vehicle.

Hazard warning signaling is given by concurrently operating the two switches 26, 28 at 50% duty cycles as if each one alone were giving a corresponding turn signal with the flashes from the two lamps 12, 14, being essentially exactly in phase with each other. The fact that the two lamps 12, 14 are actually being intermittently energized on a mutually exclusive basis during the time intervals that they are being duty cycled, will not be apparent to the human eye for a sufficiently high duty cycle frequency. The control logic 30 is connected to a hazard warning switch (not shown in FIG. 1) such that when that switch is actuated by the driver to give a hazard warning, the control logic causes the two switches 26, 28 to be concurrently operated at 50% duty cycles, but with their respective duty cycles mutually exclusive.

Marker interrupt is a recognized convention among the drivers of highway trucks and tractors for signaling purposes at night-time after the vehicle running lamps have been illuminated. Marker interrupt signaling is given by momentarily interrupting the otherwise continuous night-time illumination of the running lamps on the automotive vehicle (i.e. truck or tractor) and any attached vehicle (i.e. a trailer). The running lamps typically comprise the tail lamps, parking lamps, and marker, or clearance, lamps. The running lamps are turned on from a switch that is commonly referred to as the park switch. The park switch may be separate from, or integrated with, the vehicle's headlamp switch, but when it is actuated, the running lamps are continuously illuminated. The marker interrupt switch is separate from the part switch and serves to momentarily interrupt current to the running lamps whereby the tail/park/marker lights are momentarily extinguished to thereby provide what is commonly called the marker interrupt signal.

Control logic 30 is connected to receive commands from park and interrupt switches (not shown in FIG. 1) which are available to the driver. The control logic responds to the actuation of these switches to operate the running lamps in the manner just described.

Figure 2:
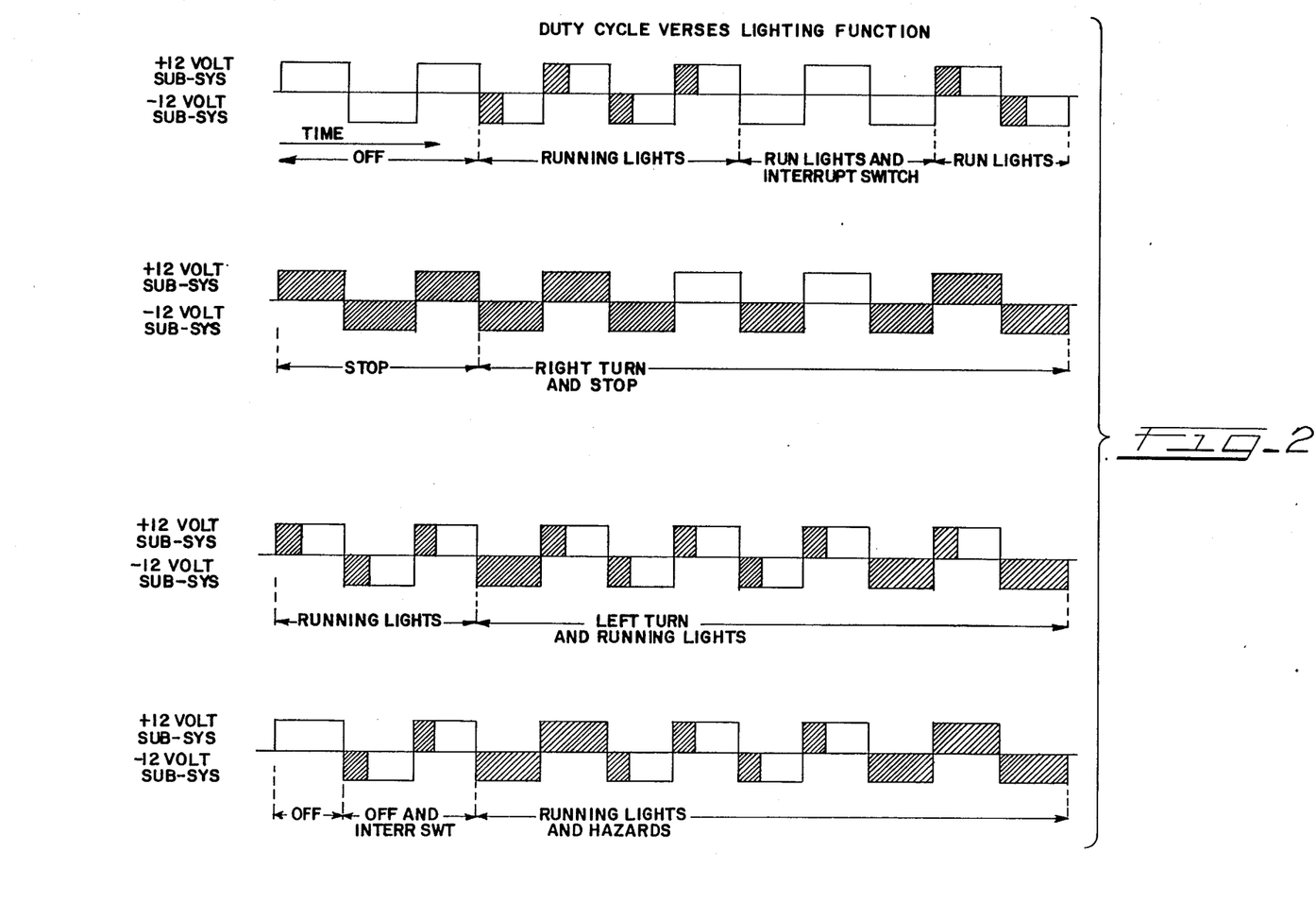
FIG. 2 is a view of certain electrical waveforms useful in explaining principles of the system of FIG. 1.

FIG. 2 portrays waveforms representing various of the aforedescribed signaling modes, and it is believed that one who has ordinary knowledge of automotive electrical principles will readily understand these waveforms from the preceding description such that a further detailed description of each waveform is unnecessary. The several waveforms contain appropriate identification of the respective modes of operation which they portray. The waveforms are intended to be representative of principles of the invention, and should not necessary be construed as actual waveforms.

The control logic is also endowed with the ability to assign priorities to the several signaling functions. The manner in which this priority assignment is accomplished will be explained in connection with the description of a detailed electrical schematic diagram (FIG. 6) which presents greater detail of FIG. 1.

Figure 3:
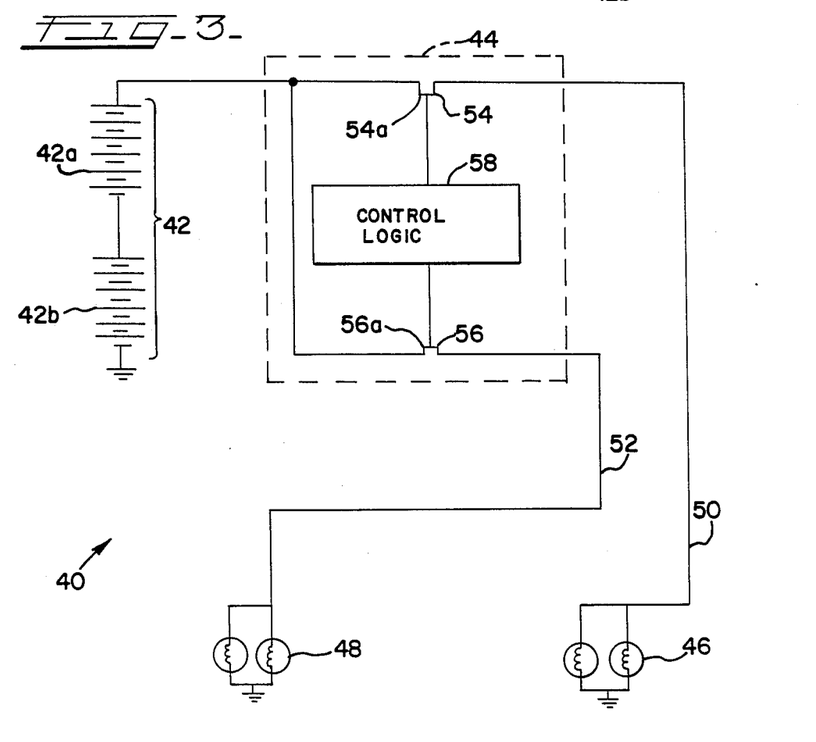
FIG. 3 is a schematic block diagram of a three-wire type system embodying principles of the invention.

FIG. 3 illustrates a "three wire" type system 40 embodying principles of the invention. It has a 24-volt power supply 42 depicted as two 12-volt D.C. batteries 42a, 42b, in series. The negative terminal of battery 42b is connected to ground while the positive terminal of battery 42a is connected to a multiplex control 44. The multiplex control in turn connects to a both a left lamp load 46 and a right lamp load 48, but by two separate wires 50, 52, respectively. In addition to the use of two separate wires for the respective lamp loads, system 40 differs from system 10 in that each lamp load has a 12-volt D.C. continuous rating and there are no diodes, such as 12d, 14d, associated with the lamp loads.

Multiplex control 44 comprises two controlled conduction switches 54, 56 whose respective main controlled conduction paths connect between the positive terminal of battery 42a and the respective loads 46, 48. A control logic 58 controls the conduction states of the two switches 54, 56, via connections to respective control terminals 54a, 56a, of the two switches. The control logic receives command inputs from various switches (not shown in FIG. 3) which are controlled by the driver of the vehicle. These are the same switches mentioned in connection with the description of FIG. 1. Like system 10 of FIG. 1, the control logic 58 of system 40 comprises means for causing the two switches to execute duty cycle operation up to maximum 50% duty cycle and with the respective duty cycles being mutually exclusive, i.e. at most only one switch 54, 56, conducting at any instant of time. While such mutual exclusivity of conduction has the definite advantage of minimizing the peak current draw, total mutually exclusivity of conduction is not essential in this embodiment because each load is served by its own wire.

At its maximum 50% duty cycle, each switch 54, 56, causes a positive 24-volt square wave, meaning one that has a positive 24-volt maximum and zero volt minimum, to be impressed across the switch's load. The effect is essentially that of a positive 12-volt D.C. continuous voltage across each load, a voltage corresponding to the load's rating. If each lamp load is of the type for giving a stop signal indication upon being energized at its full rated voltage, the application of the 24-volt square wave to it will cause such a signal to be given. Stop (braking) signaling is given by continuously and simultaneously subjecting both right and left lamps to 24-volt square waves. Hazard warning signaling is given by subjecting both lamps to concurrently applied 50% duty cycle energization at periodic intervals, such as one-half second of such energization, followed by one-half second of no energization, etc. Left turn signaling is given by operating only switch 54 at 50% duty cycle at the desired flashing rate, such as during alternate half-second intervals; right turn signaling, by operating only switch 56 according to such a schedule. The tail lamp signal is given by operating both switches 54, 56, at less than 50% duty cycle, for example, 30% duty cycle.

Figure 4:
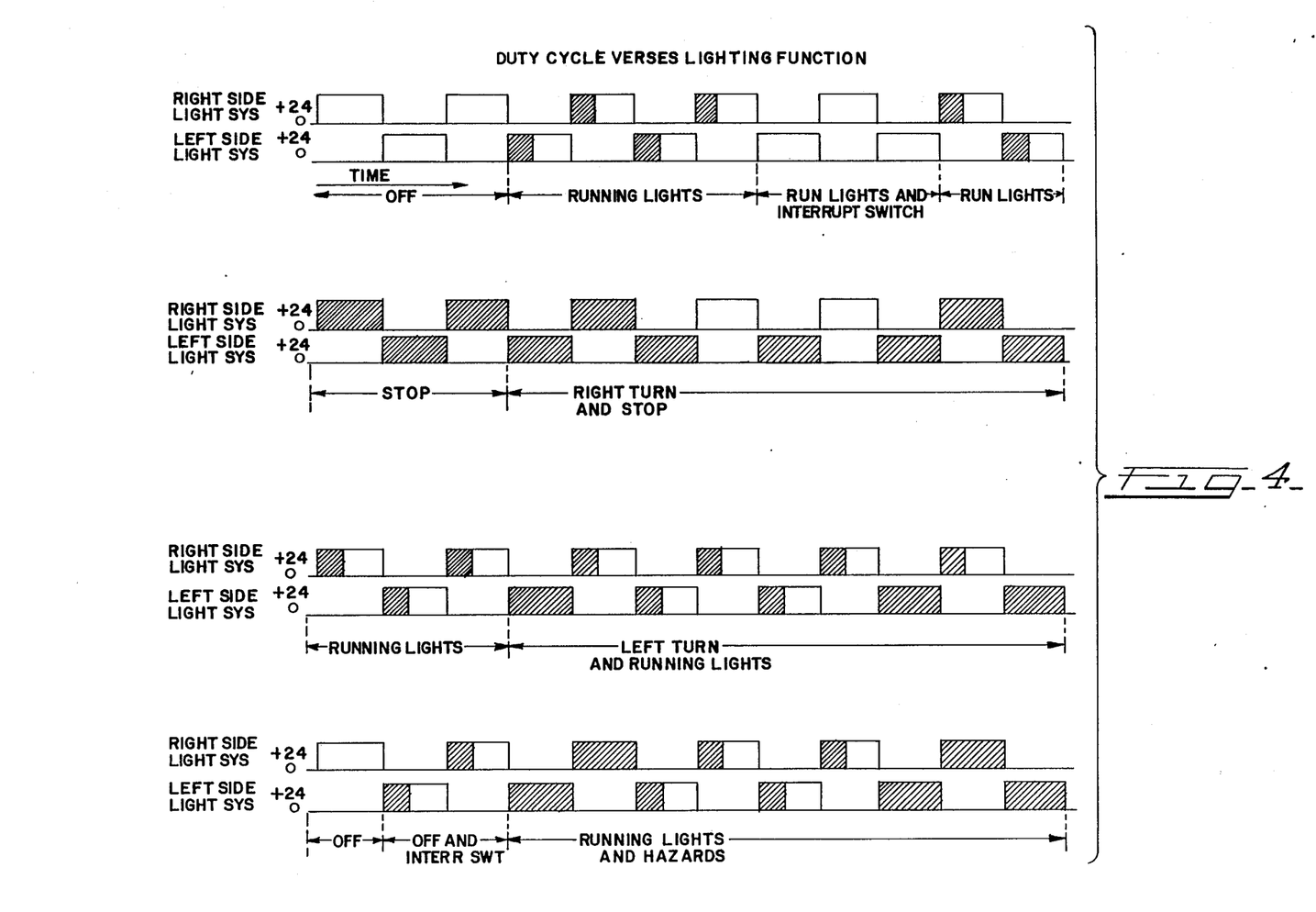
FIG. 4 is a view of certain electrical waveforms useful in explaining principles of the system of FIG. 3.

The control logic 58 comprises means for assigning ordered priority to these several functions, as will become more apparent from the detailed circuit description that will be given later. FIG. 4 portrays representative waveforms of these various modes of operation, and it is believed that they are self-explanatory in view of the foregoing description. It is to be emphasized that the waveforms are representative of principles of the invention and that they should not necessarily be construed as actual waveforms.

Figure 5:
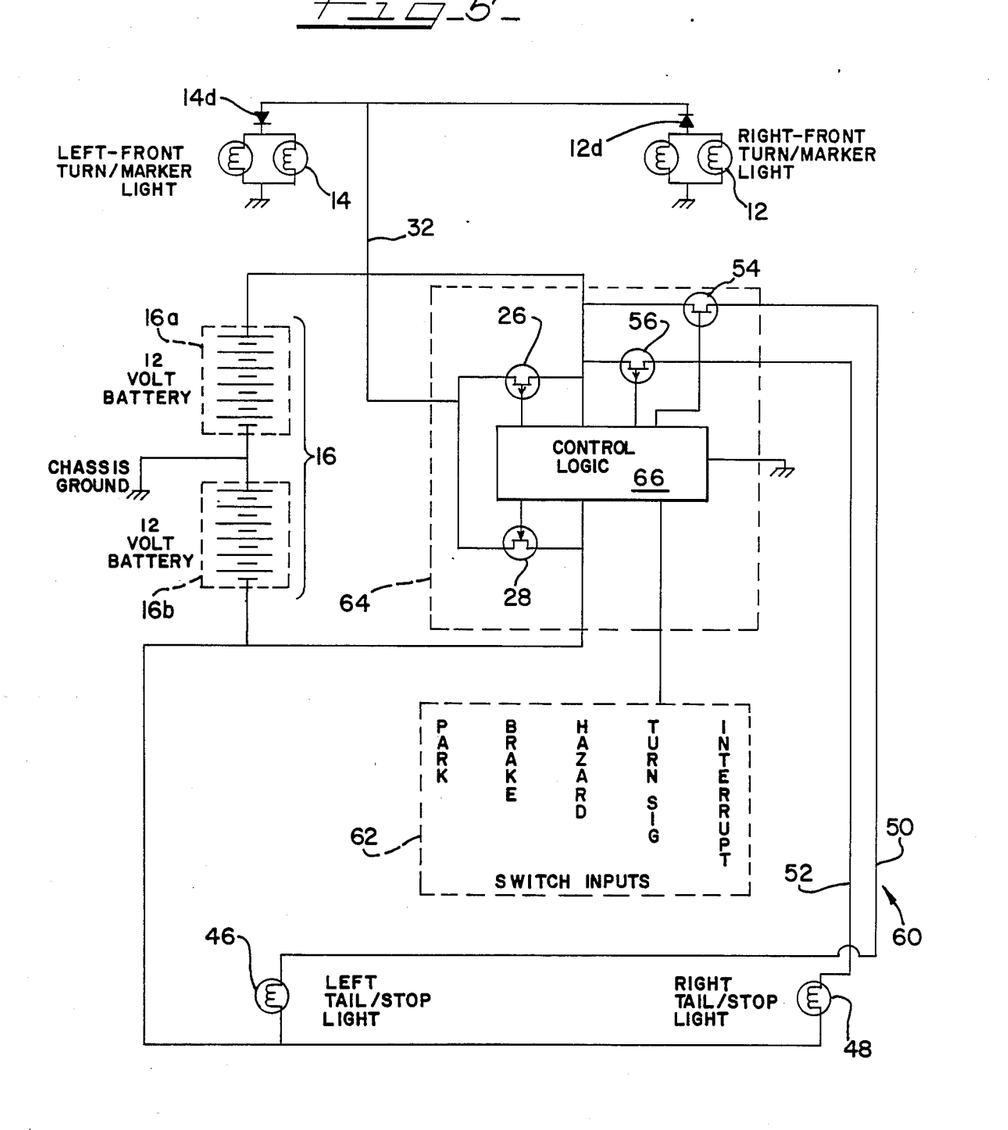
FIG. 5 is a schematic block diagram of a combination two-wire, three-wire system.

FIG. 5 illustrates a combination "two wire", "three wire" system 60 which takes advantage of the features of each type of system. The driver-actuated switch inputs are collectively identified by the block 62. While the multiplex control is designated by the new reference numeral 64, use of the reference numerals 26, 28, and 54, 56, for the respective "two-wire" and "three-wire" controlled conduction switches is retained. The control logic is assigned a new reference numeral 66. The power supply configuration is the 24-volt grounded center tap one of FIG. 1, and therefore, the reference numerals 16, 16a, and 16b, are used in FIG. 5 to designate the power supply.

The two lamp loads 12, 14 are respectively disposed on the vehicle to be the right and left front turn/marker lights, and as in FIG. 1, are coupled to switches 26 and 28 by the single wire 32. The two lamp loads 46, 48 are respectively disposed on the vehicle as the left and right tail/stop lights, and as in FIG. 3, are coupled to switches 54 and 56 respectively by the respective wires 50, 52.

When the park switch is actuated by the driver, all four lamps 12, 14, 46, 48 are operated to give a level of illumination indicative of parking and tail lamps, the front lamps being energized in the manner described for FIG. 1 and the rear lamps in the manner described for FIG. 3. Actuation of the marker interrupt switch at this time will extinguish the lamps. The typical manner of operation of the marker interrupt switch comprises one or several momentary actuations by the driver so that the lamps are momentarily turned of and on to provide the marker interrupt signal.

When the brake (stop) switch is actuated by the driver applying the service brakes, the rear lamps 46, 48 are energized with 24-volt square waves so as to illuminate at full intensity for a stop signal. If the park switch happened to be commanding park/tail lamp operation at the time that the brake switch were actuated, the control would cause the brake signal to override the park/tail signal and illuminate the rear lamps at maximum intensity while the front lamps continue to give parking lamp illumination levels.

If the right turn signal switch only is actuated, the right lamps 12, 48 will flash on and off until cancelled. Similarily, if the left turn signal switch only is actuated, the left lamps 14, 46 will flash on and off until cancelled.

If the hazard warning switch only is actuated, all four lamps 12, 14, 46, 48 will flash on and off until the hazard warning is cancelled.

The assigned order of priority, from highest to lowest, is: hazard warning; turn signal; brake (stop); marker interrupt; and tail/park/marker. The control logic comprises means for overriding any lower priority command by one of higher priority. For example, the brake signal will override the tail/park/marker signal; the hazard warning will override any other signal. If one of the turn signal commands is given concurrently with the stop lamp signal, the lamps on the side that is toward the direction of turning will flash on and off while those on the opposite side will continue to give a stop signal.

System 60 combines the advantages of both "two-wire" and "three-wire" systems in the following ways. The right and left rear lamps have independent wires and therefore are in effect independent branches. Certain failures may effect only one branch, and hence at least some signaling capability at the rear of the vehicle may be retained in the event of such a failure. The use of a single wire to feed both right and left front lamps saves on the amount of wiring and number of connections for these lamps.

Figure 6:
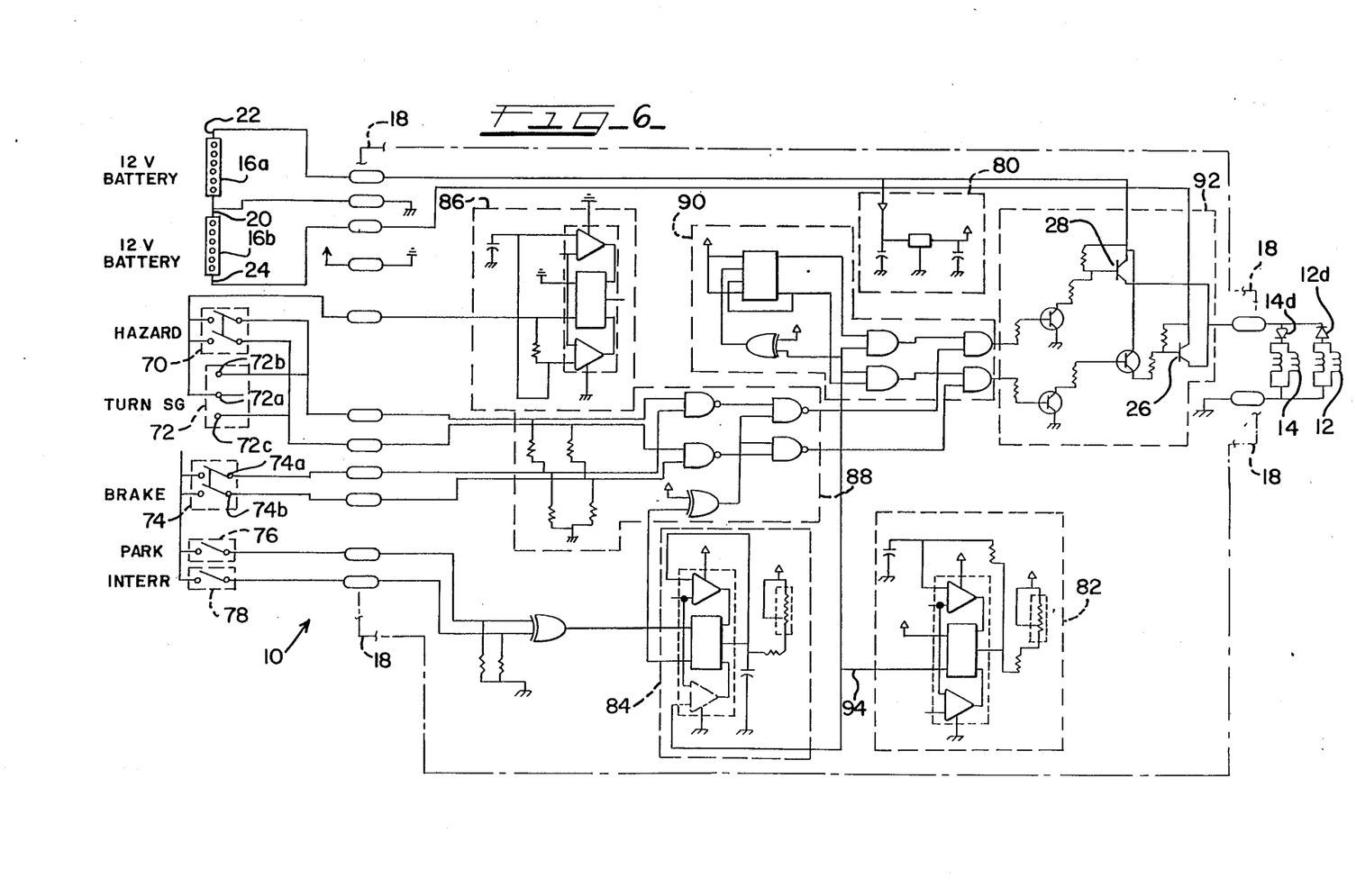
FIG. 6 is a detailed electrical schematic diagram of the system of FIG. 1.

FIG. 6 is a detailed electrical schematic of system 10. Like reference numerals in both Figs. designate like components. The various driver-operated switches are illustrated in FIG. 6 as follows: hazard warning switch, 70; turn signal switch 72; brake (stop) switch 74; park switch 76; marker interrupt switch 78. All these switches are normally open when not actuated by the driver.

The power supply 16, the lamps 12, 14, and the switches 70, 72, 74, 76, 78, connect to multiplex control 18 via conventional wiring and connectors, the multiplex control being illustrated as a separate module containing controlled conduction switches 26, 28 and numerous discrete electronic components forming the control logic 30. Alternatively, the multiplex control could be embodied in other ways such as a microprocessor-based control.

For convenience, multiplex control 18 is described generally as consisting of several major circuit sections, namely; a regulated power supply 80; a clock 82; a timer circuit 84 operating in monostable mode; another timer circuit 86 operating in astable mode; a priority override section 88; a multiplex section 90; and a power control section 92. These sections are fabricated from conventional, commercially available circuit components, as indicated on the face of the drawing by the assigned designations.

Regulated power supply 80 converts the positive 12-volts of battery 16a into a level suitable for the various electronic components, a regulated positive 5-volts in the illustrated embodiment.

Clock 82 operates at a frequency established by the RC circuit associated with it. The particular frequency is set by the particular setting of a potentiometer R11 which forms a part of the RC circuit. Clock 82 provides a clock signal via a line 94 to both timer circuit 84 and multiplex section 90.

Timer circuit 84 is under the control of park switch 76 and interrupt switch 78. These two switches are arranged in an input circuit which includes an EXCLUSIVE OR gate U7B whose two inputs are pulled down to ground through respective resistors R6, R7. One input of gate U7B connects to one side of park switch 76 while the other input connects to one side of interrupt switch 78. The other side of each switch connects to the positive 5-volt reference provided by supply 80.

Timer circuit 84 is arranged for monostable operation to issue a pulse of desired width in response to each clock pulse from clock 82, provided that the signal at the reset input of the timer circuit is receiving a high logic signal. Because it is the reset input of timer circuit 84 which is connected to the output of EXCLUSIVE OR gate U7B, issuance of pulses from timer circuit 84 is controlled strictly by the conditions of the two switches 76, 78. A high logic signal will be present at the output of gate U7B only if one or the other, but not both, of the two inputs from switches 76, 78 is high, i.e. one or the other of the switches closed. Accordingly, when the park switch 76 is actuated to closed condition while interrupt switch 78 remains non-actuated open, the requisite high is present at the reset input of U3B of timer 84 to cause a train of pulses of desired width to appear at the output of timer circuit 84. The frequency of these pulses is that of the clock pulse, and the width of the pulses is established by the setting of a potentiometer R9 in an RC circuit associated with the timer circuit. The frequency and width of the pulses from timer 84 are such that the lamps are commanded to a give a tail/marker/park level of illumination. The particular details by which this result is attained will become apparent from the further description later on.

If the interrupt which 78 is actuated while park switch 76 is also actuated, the EXCLUSIVE OR gate U7B will cause the signal at the rest input of U3B to go low. This arrests the pulse train output of the timer circuit and terminates the tail/marker/park command to the lamps. Accordingly, the lamps extinguish (assuming no higher priority command is concurrently being given). The momentary operation of the interrupt switch on and off by the driver is therefore effective to turn the tail/marker/park lamps off and on, and provide the interrupt signal.

Furthermore, the circuit has the ability to provide marker signaling when the park switch is off by simply actuating the interrupt switch. During the day, the park switch will typically not be actuated, but certain lighting conditions may be conducive to marker signaling. Actuation of the interrupt switch only will be effective through the EXCLUSIVE OR gate U7B to cause timer circuit to issue pulses at output 94 and cause the tail/marker/park level of illumination of the lamps, and thereby give tail/marker/park signalling without the part switch being actuated. This circuit per se constitutes a novel aspect of the invention.

The hazard warning, turn signal, and brake switches 70, 72, 74, form inputs to override priority section 88, in addition to the clock input from timer circuit 84. Override priority section 88 comprises four NAND gates U4A-D connected as illustrated to form two halves of the section, one half being associated with the right lamps and the other half with the left. Section 88 also includes an EXCLUSIVE OR gate U7A connected to function as an inverter for the output signal from circuit 84.

Brake switch 74 has two sets of contacts 74a, 74b. One side of each set is connected to the positive 5-volt reference. The other side of 74a connects to one input of gate U4A while the other side of 74b connects to one input of gate U4C. These two gate inputs are respectively pulled down to ground through respective resistors R4, R5 when the brake switch is open, but are driven to positive 5-volts when the switch is closed.

Turn signal switch 72 comprises a common terminal 72a connected to the output of timer circuit 86. The two remaining terminals 72b, 72c connect respectively to the other input of gate U4A and the other input of gate U4C respectively. These other inputs of gates U4A and U4C are pulled down to ground, not directly, but rather than through coupling by respective resistors R2, R3 to the respective first-mentioned inputs of the same gates. This is done for a purpose, as will soon become apparent.

Hazard warning switch 70 has a pair of contacts ganged for operation in unison. One side of each is connected directly to the output of timer circuit 86. The other side of one connects to the same input of gate U4A as one of the turn signal terminals while the other side of the second connects to the same input of gate U4C as the other of the turn signal terminals.

Briefly, the override priority section 88 functions as follows. When neither hazard warning nor brake nor turn signal switch is actuated, the presence of pulses from timer circuit 84 caused by closure of either one or the other (but not both) of switches 76, 78, is effective through gates U4B, U4D to cause multiplex circuit 90 to operate the lamps to tail/marker/park intensity.

If brake switch 74 is actuated, neither the turn signal nor hazard warning switch being concurrently actuated, it causes the lamps to illuminate at stop signal intensity, overriding the park/interrupt if either one of switches 76, 78 is being concurrently actuated. Actuation of the brake switch applies full positive 5-volt potential directly to one input of gate U4A and to one input of gate U4C. Resistors R2, R3 couple essentially this same voltage to the other input of each gate U4A, U4C. Consequently, the outputs of both these gates are forced low to in turn force the outputs of gates U4B, U4D high, irrespective of the status of the output from gate U7B.

If turn signal switch 72 only is actuated for a turn in a particular one of its two directions, it conducts the signal from timer circuit 86 to the corresponding one input of the corresponding NAND gate U4A, U4C, depending on the particular direction selected. This is where resistors R2, R3 again come into play. The relative resistance of the ground side resistors R4, R5 is sufficiently great relative to that of resistors R2, R3 that the signal from timer circuit 85 applied directly to the one input of the selected one of gates U4A, U4C is in essence also applied to the other input of the same gate. Hence, in response to the applied timer circuit waveform, the selected one of the two gates U4A, U4C sees simultaneous high signals at its two inputs followed by simultaneous low signals, making the output signal from the particular selected gate U4B, U4C a square waveform corresponding to the square waveform of the timer circuit. Since the output from U7B will be a high signal (it being assumed for purposes of explanation that only the turn signal switch is being actuated), the square wave signal from gate U4A will be transmitted through gate U4B to multiplex circuit 90. Consequently, the lamp load on the side toward the direction of turn will flash on and off until the turn signal switch is cancelled, the particular details of how the multiplex circuit operates to be explained hereinafter.

If the brake switch were being actuated concurrently with the actuation of the turn signal switch, the lamp on the side opposite the direction of turn indication would be illuminated to give a stop indication signal so long as the brake switch continued to be actuated.

If the hazard warning switch 70 only is actuated, the square wave from timer circuit 86 is in effect transmitted through to the outputs of both gates U4B, U4D, and the ensuing action of multiplex circuit 90 causes both lamps to flash in unison to give the hazard warning signal. Since both turn signal switch 72 and hazard warning switch 70 are fed from timer circuit 86, actuation of the hazard warning switch while the turn signal switch is already actuated will not interfere with the flashing action of the lamp on the side selected by the turn signal switch, and will serve merely to provide a cumulative command for that side while causing the lamp on the opposite side to begin flashing in unison with the already flashing side. Hence the hazard warning command has priority over the turn signal function. If the turn signal switch is cancelled while the hazard warning switch remains actuated, the lamps on both sides will continue giving the hazard warning signal.

The multiplex section 90 comprises a D-type flip-flop U1, an EXCLUSIVE OR gate U7C connected to invert the clock signal from circuit 82 for clocking flip-flop U1, and four AND logic gates U2A-D, all connected as illustrated in drawing FIG. 6. The AND gates form a right half and a left half, corresponding to the right and left halves of the override priority section 88. Both the "Q" and the "not Q" outputs of flip-flop U1 are used to control the AND logic gates. The D input of the flip-flop is wired to the "not Q" output so that the flip-flop toggles from one state to the other in response to each inverted clock pulse appled to its clock input.

The "Q" output connects to AND gate U2A, and the "not Q" output to AND gate U2C with the result that these two gates are alternately "enabled", each being enabled every other clock pulse. The remaining input of each gate U2A, U2C is connected to the output of clock circuit 82. In this way the output of each gate U2A, U2C is alternately high and low, and exactly the opposite of the other with full assurance of mutual exclusivity. In other words, if the output of gate U2A is high, the output of gate U2C will be low, and vice versa.

The output of gate U2A provides one input to gate U2B, and the output of gate U2C provides one input to gate U2D. The other input of gate U2B is from the output of NAND gate U4B, and the other input of gate U2D is from the output of NAND gate U4D. The output of gate U2B is the input to one half (the left half) of power control section 92, and the output of gate U2D is the input to the other half (the right half) of section 92.

With this arrangement, override priority section 88 transmits to multiplex section 90 the highest priority command of all commands being presently given. (Of course if only one command is being given, it has the higher priority). If a turn signal command only is being given, the multiplex circuit operates a corresponding one of two halves of the power control section to develop the previously described waveform pattern for turn signaling. If the tail/marker/park command only is presently being given, the two NAND gates U4B, U4D impose their respective similarly reduced duty cycles on AND gates U2B, U2D respectively so that the two halves of the power control section are operated at similarly reduced duty cycles to produce the tail/marker/park level of illumination. If the brake command only is given, the two gates U2B, U2D operate at essentially full 50% duty cycles each. If the hazard warning command only is given, the two halves of the power control section are operated by the gates U2B, U2D in accordance with the previously described waveform patterns to cause both lamps 12, 14 to give hazard warning signalling.

The power control section 92 comprises two halves, a right half associated with the right half of multiplex section 90 and a left half associated with the left half of multiplex section 90. The front ends of the two halves of the power control section are identical, each comprising a simple transistor circuit, T2, T4 respectively, operating in a common emitter configuration with a collector load. For the left half, the collector load is the control input circuit of controlled conduction switch 28, and for the right half, the collector load is a PNP transistor T3 which is in turn connected to the control input circuit of controlled conduction switch 26. The illustrated switch 26 is an NPN transistor while the switch 28 is a PNP transistor. Each switch is normally non-conductive, but is switched into conduction through the corresponding power control section half when the corresponding gate U2b, U2D of multiplex section 90 has a high signal at its output.

Figure 7:
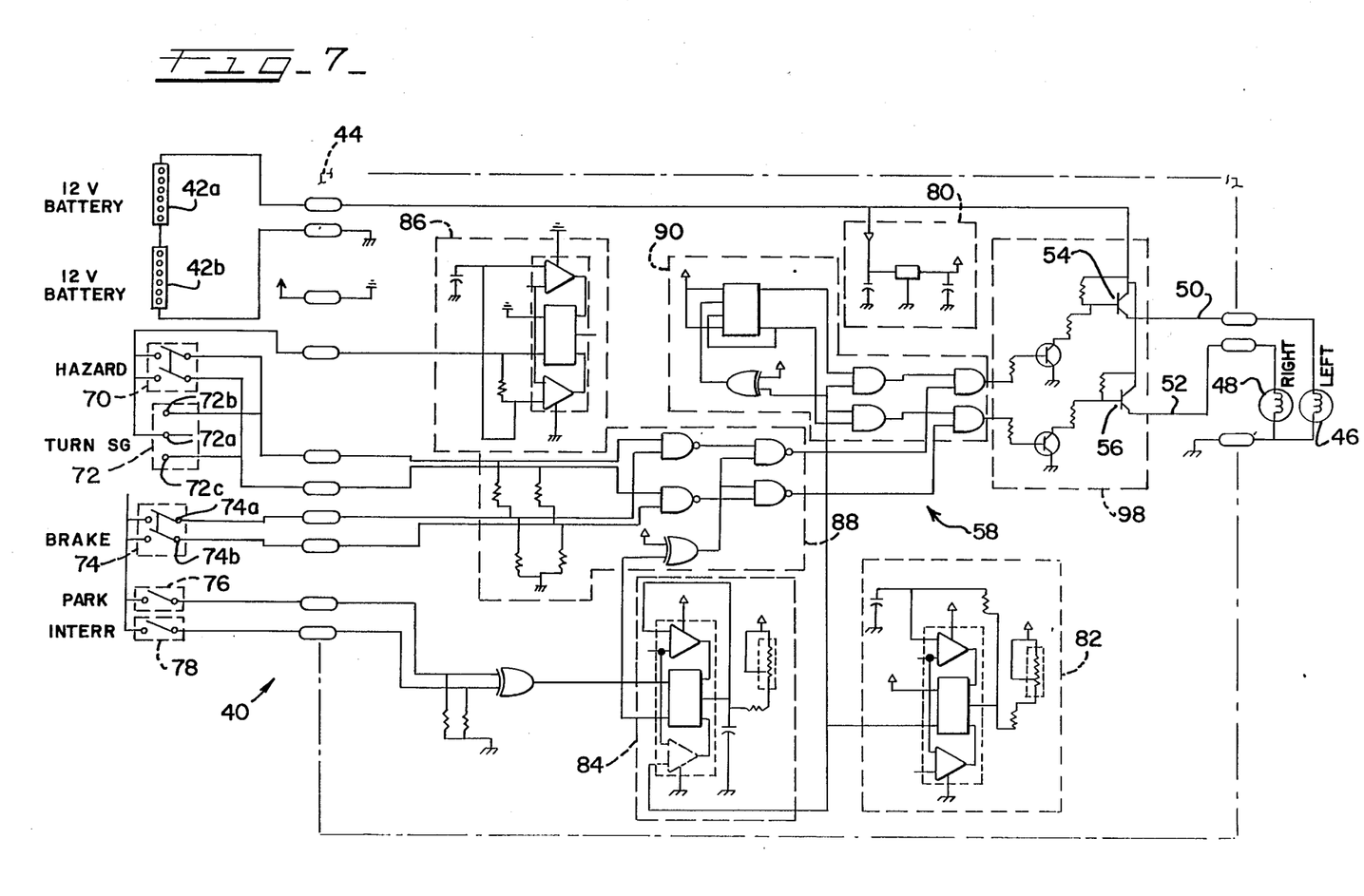
FIG. 7 is a detailed electrical schematic diagram of the system of FIG. 3.

FIG. 7 is a detailed electrical schematic of system 40. The details of its control logic are identical to the details of control logic 30 and are identified by like reference numerals. The several input switches are connected to control logic 58 in the same manner as in FIG. 6. Accordingly a detailed description will not be repeated in the interest of brevity.

Apart from the differences previously described between the embodiments of FIGS. 1 and 3, the circuit of FIG. 7 differs from that of FIG. 6 only in one half of the power control section. In FIG. 7 the power control section is assigned the reference numeral 98. The left half of section 98 is identical to the left half of the power control section 92 of FIG. 6. In FIG. 7 the right half of the power control section is made identical to the left half so that both halves use a PNP transistor for switches 54, 56. The collector of each PNP transistor connects via its own wire 50, 52 to the corresponding lamp load 46, 48.

Figure 8:
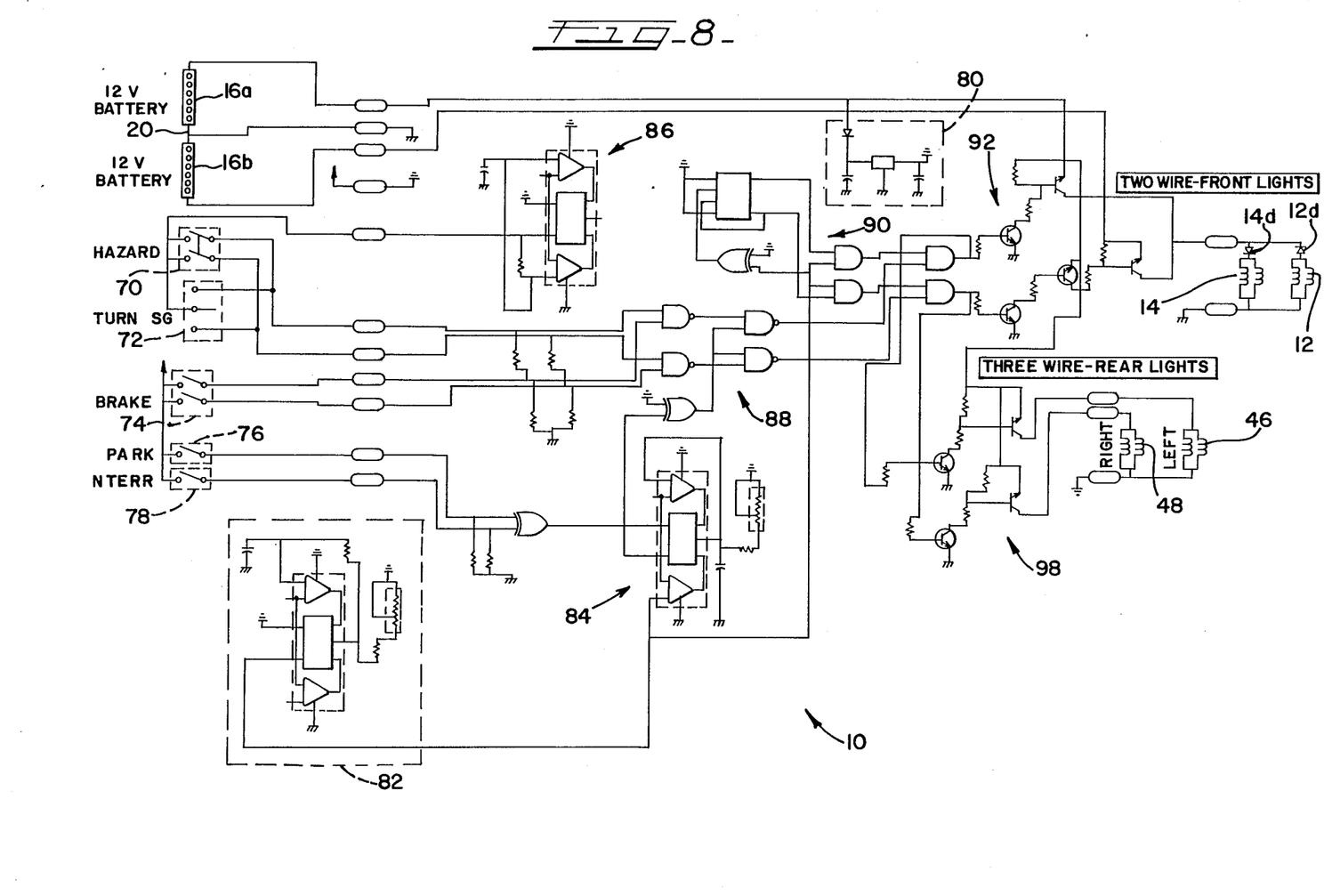
FIG. 8 is a detailed electrical schematic diagram of the system of FIG. 5.

FIG. 8 is a detailed electrical schematic of system 60. Details of its control logic are identical to the details of control logic 30 and are identified by like reference numerals. The several input switches are connected to the control logic in FIG. 8 in the same manner as in FIG. 6, and therefore a detailed description will not be repeated in the interest of brevity.

The circuit of FIG. 8 amounts to a combination of the two power control sections of the embodiments of FIGS. 6 and 7 with the control logic. The "two-wire" part of the system embodies the power control section 92 of FIG. 6, and the two lamps 12, 14 with associated diodes 12d, 14d are the right and left front lamps on the vehicle. The power control section 98 of FIG. 7 is incorporated into the FIG. 8 embodiment as the "three-wire" part of the system. The two lamps 46, 48 are the left and right rear lamps on the vehicle.

Figure 9:
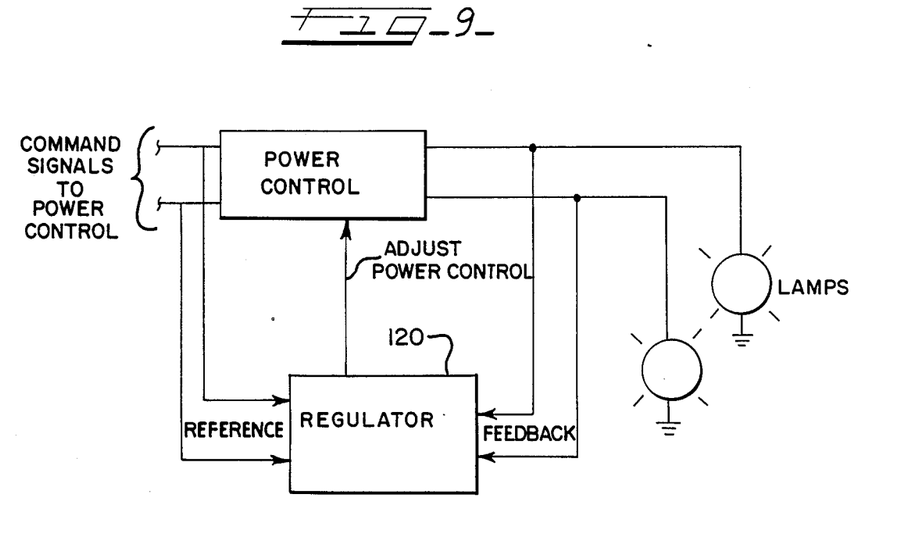
FIG. 9 is an electrical schematic diagram illustrating a modification.

FIG. 9 represents a modification applicable to the load in any of the preceding embodiments. A regulator circuit 120 is associated with the circuit, for example with the power control section, to assure that for each particular command signal, the appropriate amount of power to the load is in fact being delivered by the power control section.

The illustrated regulator circuit is in the nature of a negative feedback circuit show reference level is set to a particular reference power level appropriate to the particular signal which the load device is being commanded to deliver. The regulator circuit monitors the power to the load, such as by current and/or voltage measurement and adjusts the power input either more or less to achieve the desired level. In this way, the correct power input to the load is consistently assured despite variations in power supply voltage. This will avoid undesired dimming of the lights under low voltage conditions.

The particular details of the regulator are implemented using conventional feedback control principles. Various forms of circuits can be used, but since the generic principles of the invention involve what may be deemed pulse width modulation, the embodiment of regulator 120 as a modulator of the pulse width of the voltage to the loads is especially advantageous.

In the three-wire type circuit, the rear lamps are not grounded because they are energized from the 24-volt potential which swings between $+12$ volts D.C. and $-12$ volts D.C. However, in the two-wire type, the lamps may be grounded to the body or chassis by any conventional form of ground connection. Such ground connection may be inherently established by the manner in which the lamp itself is fabricated and mounted on the vehicle or there maybe a separate ground wire.

Although circuit protection for the various electrical devices has not been specifically illustrated in the schematic figures, it is to be understood that known forms of circuit protection are preferably incorporated into the circuits.

While a preferred embodiment of the invention has been illustrated and described, it is to be appreciated that principles of the invention may be practiced in other embodiments.

What is claimed is:

1. In an automotive vehicle signal lamp system which comprises respective right and left signal lamp loads of given continuous D.C. voltage and illumination ratings on respective right and left sides of a vehicle for providing visible signals on the right and left sides of a vehicle, a D.C. power supply for energizing said lamp loads, and circuit means operatively coupling said D.C. power supply with said lamp loads, said circuit means including switch means for selectively energizing said lamp loads from said D.C. power supply to produce said signals, the improvement which comprises said power supply comprising means providing a lamp-load-energizing D.C. voltage the magnitude of which is essentially twice the given continuous D.C. voltage rating of said lamp loads, and said circuit means comprising means for operating said switch means to cause said lamp-load-energizing D.C. voltage to be duty-cycle applied to said lamp loads in such a manner that the time average value of voltage which is applied to said lamp loads is substantially the same as the given continuous D.C. voltage rating of said lamp loads and said lamp loads are caused to emit substantially their rated illumination without any perceptible flickering.

2. The improvement set forth in claim 1 in which said means for operating said switch means comprises means for causing said lamp-load-energizing voltage to be applied at any given instant in a mutually exclusive manner to said loads such that said lamp-load-energizing voltage is applied to only one of said lamp loads at any given instant.

3. The improvement set forth in claim 1 in which said D.C. power supply and said switch means comprises means for delivering different polarities of said lamp-load-energizing voltage to said lamp loads, and said lamp loads comprise polarity-sensitive means for rendering one of them responsive to only a particular one of said polarities of said lamp-load-energizing voltage and the other of them responsive to only a particular other of said polarities of said lamp-load-energizing voltage.

4. The improvement set forth in claim 3 in which said lamp loads are served by a common conductor which delivers said different polarities of said lamp-load-energizing voltage to said lamp loads, and said polarity-sensitive means comprises diodes which are oppositely poled in circuit with the respective lamp loads.

5. The improvement set forth in claim 4 in which said different polarities of said lamp-load-energizing voltage comprise respective opposite polarity portions of a square wave voltage which appears on said common conductor.

6. The improvement set forth in claim 1 in which said circuit means comprises control logic means for operating said switch means in accordance with signal command inputs to said control logic means to cause said lamp loads to produce different signals corresponding to different signal command inputs.

7. The improvement set forth in claim 6 in which said control logic means comprises means for according a predetermined priority to said different signal command inputs such that said lamp loads are caused to exhibit the signal commanded by the highest priority signal command which is being input to said control logic means.

8. The improvement set forth in claim 7 in which said signal command inputs include, in decreasing order of priority, hazard warning, right and left turn, brake, and running lamp commands, and said control logic means comprises means for controlling the operation of said switch means in a particular manner for each command.

9. The improvement set forth in claim 6 in which said control logic means comprises means for imposing on said switch means particular duty cycles of operation corresponding to particular ones of said signal command inputs.

10. The improvement set forth in claim 9 including feedback regulator means for monitoring the power flow to said lamp loads for each of the different signal command inputs and for causing the appropriate power flow for each particular signal command input to be maintained to the lamp loads despite variations in the magnitude of said lamp-load-energizing voltage due to variations in the magnitude of said D.C. power supply voltage.

11. The improvement set forth in claim 10 in which said feedback regulator means comprises means for varying the duty cycle operation of said switch means in a manner to cause the appropriate power flow for each particular signal command input to be maintained to the lamp loads.

12. The improvement set forth in claim 6 in which said control logic means comprises timing means for establishing a basic time unit for said control logic means and multiplex means operating at said basic time unit to multiplex said lamp-load-energizing voltage to said lamp loads.

13. The improvement set forth in claim 12 in which said control logic means comprises override priority means for according a predetermined priority to said different signal command inputs, said override priority means receiving said signal common inputs and interacting with said multiplex means to cause the multiplexing of said lamp-load-energizing voltage to said lamp loads such that said lamp loads are energized by said lamp-load-energizing voltage on particular duty cycle bases corresponding to the respective signal command inputs with the particular duty cycle imposed being the one corresponding to the highest priority signal command that is being received by said override priority means.

14. The improvement set forth in claim 13 in which said signal command inputs include, in decreasing order of priority, hazard warning, right and left turn, brake, and running lamp commands, and said override priority means interacts with said multiplex means to transmit to said multiplex means from those command signals being given, the one that has the highest priority.

15. The improvement set forth in claim 14 in which said override priority means comprises plural logic gates organized and arranged to transmit to said multiplex means from those command signals being given, the one which has the highest priority.

16. The improvement set forth in claim 15 in which said logic gates comprise a first set of gates associated with one of said lamp loads and a second set of gates associated with the other of said lamp loads, said hazard warning signal command input being provided through a hazard warning switch to one particular input of both sets of gates, said right and left turn signal command inputs being provided through a turn signal switch selectively to both sets of gates, the right turn signal command to said one particular input of said first set of gates and the left turn signal command to said one particular input of said second set of gates, and said brakes command input being provided through a brake switch to another particular input of both sets of gates.

17. The improvement set forth in claim 16 in which the running lamping command signal input is provided to both sets of gates.

18. The improvement set forth in claim 17 in which said running lamp command signal is conjointly developed by means of respective park and interrupt switches which operate through an EXCLUSIVE OR gate on said override priority means such that said running lamp command signal is transmitted to said override priority means only if either one, but not both, of said park and interrupt switches is actuated.

19. The improvement set forth in claim 14 in which the running lamp command signal input is conjointly developed by means of respective park and interrupt switches which operate through an EXCLUSIVE OR gate on said override priority means such that said running lamp command signal is transmitted to said override priority means only if either one, but not both, of said park and interrupt switches is actuated.

20. The improvement set forth in claim 6 in which said control logic means comprises means responsive to a particular one of said signal command inputs for causing the lamp-load-energizing voltage to be duty-cycle applied to said lamp loads, and means responsive to a particular other of said signal command inputs for causing the lamp-load-energizing voltage to be duty-cycle applied to said lamp loads in such a manner that the time average value of voltage which is applied to said lamp loads is sufficiently less than the given continuous D.C. voltage rating of said lamp loads that said lamp loads are caused to emit noticeably less than their rated illumination and still without perceptible flickering.

21. The improvement set forth in claim 20 in which said means responsive to a particular other of said signal command inputs for causing the lamp-load-energizing voltage to be duty-cycle applied to said lamp loads in such a manner that the time average value of voltage which is applied to said lamp loads is sufficiently less than the given continuous D.C. voltage rating of said lamp loads that said lamp loads are caused to emit noticeably less than their rated illumination and still without perceptible flickering comprises means for applying said lamp-load-energizing voltage to said lamp loads at a duty cycle of operation which is less than a duty cycle of operation at which said lamp-load-energizing voltage is applied to said lamp loads to cause said lamp loads to emit substantially their rated illumination.

22. The improvement set forth in claim 6 in which said switch means comprises a first controlled conduction switch and a second controlled conduction switch, said control logic means comprises multiplex means for multiplexing said lamp-load-energizing voltage to said loads, said multiplex means comprises a first set of logic gates associated with one of said lamp loads and a second set of logic gates associated with the other of said lamp loads and a flip-flop which is operated to alternately enable said first and second set of logic gates to in turn alternately render said first and second controlled conduction switches conductive.

23. The improvement set forth in claim 1 in which said right signal lamp load comprises two separate lamp loads, said left signal lamp load comprises two separate lamp loads, and said switch means comprises four controlled conduction switches each of which is associated with a corresponding one of said separate lamp loads, a particular one of said two separate lamp loads of said right signal lamp load being coupled with a first of said controlled conduction switches by a corresponding conductor, a particular one of said two separate lamp loads of said left signal lamp load being coupled with a second of said controlled conduction switches by a corresponding conductor, and the other of said two separate lamp loads of both said right and left signal lamp loads being coupled with a third and fourth of said controlled conduction switches by a common conductor.

24. The improvement set forth in claim 1 in which said power supply comprises a nominal D.C. voltage, and said means providing a lamp-load-energizing voltage provides such voltage as substantially said nominal D.C. voltage.

25. The improvement set forth in claim 24 in which said lamp loads are served from said switch means by separate individual circuits.

26. The improvement set forth in claim 1 in which said power supply comprises a center tap which divides the power supply voltage into two substantially equal but opposite portions and one side of each lamp load is at substantially the same potential as that of said center tap.

27. The improvement set forth in claim 26 in which the other side of each lamp load is served by a common conductor, said portions of said power supply voltage alternately appearing on said conductor, and said lamp loads comprising polarity-sensitive means for rendering one of them responsive only to one of said portions and the other of them responsive only to the other of said portions.

28. In an automotive vehicle signal lamp system which comprises a running lamp load, a D.C. power supply for energizing said running lamp load, and circuit means operatively coupling said D.C. power supply with said running lamp load, the improvement which comprises respective park and interrupt switches which operate on said circuit means such that said running lamp load is energized only if either one, but not both, of said park and interrupt switches is actuated.

29. In a lamp system which comprises two separate lamp loads of given continuous D.C. voltage and illumination ratings, a D.C. power supply for energizing said lamp loads, and circuit means operatively coupling said D.C. power supply with said lamp load, said circuit means including switch means for selectively energizing said lamp loads from said D.C. power supply, the improvement which comprises said power supply comprising means providing a lamp-load-energizing D.C. voltage the magnitude of which is essentially twice the given continuous D.C. voltage rating of said lamp loads, and said circuit means comprising means for operating said switch means to cause said lamp-load-energizing D.C. voltage to be duty-cycle applied to said lamp loads in such a manner that the time average value of voltage which is applied to said lamp loads is substantially the same as the given continuous D.C. voltage rating of said lamp loads and said lamp loads are caused to emit substantially their rated illumination without any perceptible flickering, said means for operating said switch means comprises means for causing said lamp-load-energizing voltage to be applied at any given instant in a mutually exclusive manner to said loads such that said lamp-load-energizing voltage is applied to only one of said lamp loads at any given instant, said D.C. power supply and said switch means comprise means for delivering different polarities of said lamp-load-energizing voltage to said lamp loads, and said lamp loads comprise polarity-sensitive means for rendering one of them responsive to only a particular one of said polarities of said lamp-load-energizing voltage and the other of them responsive to only a particular other of said polarities of said lamp-load-energizing voltage.

30. The improvement set forth in claim 29 in which said lamp loads are served by a common conductor which delivers said different polarities of said lamp-load-energizing voltage to said lamp loads, and said polarity-sensitive means comprises diodes which are oppositely poled in circuit with the respective lamp loads.

31. The improvement set forth in claim 30 in which said different polarities of said lamp-load-energizing voltage comprise respective opposite polarity portions of a square wave voltage which appears on said common conductor.

32. The improvement set forth in claim 30 in which said circuit means comprises control logic means for operating said switch means in accordance with signal command inputs to said control logic means to cause said lamp loads to produce different signals corresponding to different signal command inputs to said control logic means, means for according a predetermined priority to said different signal command inputs such that said lamp loads are caused to exhibit the signal commanded by the highest priority signal command which is being input to said control logic means, and means for imposing on said switch means particular duty cycles of operation corresponding to particular ones of said signal command inputs.

33. The improvement set forth in claim 32 including feedback regulator means for monitoring the power flow to said lamp loads for each of the different signal command inputs and for causing the appropriate power flow for each particular signal command input to be maintained to the lamp loads despite variations in the magnitude of said lamp-load-energizing voltage due to variations in the magnitude of said D.C. power supply voltage.

34. In an automotive vehicle signal lamp system which comprises respective right and left signal lamp loads of given continuous D.C. voltage and illumination ratings on respective right and left sides of a vehicle for providing visible signals on the right and left sides of a vehicle, a D.C. power supply for energizing said lamp loads, and circuit means operatively coupling said D.C. power supply with said lamp loads, said circuit means including switch means for selectively energizing said lamp loads from said D.C. power supply to produce said signals, the improvement which comprises control logic means for operating said switch means in accordance with signal command inputs to said control logic means to cause said lamps loads to produce different signals corresponding to different signal command inputs, means for according a predetermined priority to said different signal command inputs such that said lamp loads are caused to exhibit the signal commanded by the highest priority signal command which is being input to said control logic means, and in which said signal command inputs include, in decreasing order of priority, hazard warning, right and left turn, and brake lamp commands, and said control logic means comprises means for controlling the operation of said switch means in a particular manner for each command, in which said control logic means comprises means for imposing on said switch means particular duty cycles of operation corresponding to particular ones of said signal command inputs, and including feedback regulator means for monitoring the power flow to said lamp loads for each of the different signal command inputs and for causing the appropriate power flow for each particular signal command input to be maintained to the lamp loads despite variations in the magnitude of said lamp-load-energizing voltage due to variations in the magnitude of said D.C. power supply voltage, in which said feedback regulator means comprises means for varying the duty cycle operation of said switch means in a manner to cause the appropriate power flow for each particular signal command input to be maintained to the lamp loads.

35. In an automotive vehicle electrical system which comprises respective first and second loads of given continuous D.C. voltage and power ratings, a D.C. power supply for energizing said loads, and circuit means operatively coupling said D.C. power supply with said loads, said circuit means including switch means for selectively energizing said loads from said D.C. power supply to operate said loads at their given continuous D.C. voltage and power ratings, the improvement which comprises said power supply comprising means providing a load-energizing D.C. voltage the magnitude of which is essentially twice the given continuous D.C. voltage rating of said loads, and said circuit means comprising means for operating said switch means to cause said load-energizing D.C. voltage to be duty-cycle applied to said loads in such a manner that the time average value of voltage which is applied to said loads is substantially the same as the given continuous D.C. voltage rating of said loads and said loads are caused to operate substantially at their rated power.

36. In an electrical system which comprises two separate loads of given continuous D.C. voltage and power ratings, a D.C. power supply for energizing said loads, and circuit means operatively coupling said D.C. power supply with said loads, said circuit means including switch means for selectively energizing said loads for said D.C. power supply, the improvement which comprises said power supply comprising means providing a load-energizing D.C. voltage the magnitude of which is essentially twice the given continuous D.C. voltage rating of said loads, and said circuit means comprising means for operating said switch means to cause said load-energizing D.C. voltage to be duty-cycle applied to said loads in such a manner that the time average value of voltage which is applied to said loads is substantially the same as the given continuous D.C. voltage rating of said loads and said loads are caused to operate substantially at their rated power, said means for operating said switch means comprises means for causing said load-energizing voltage to be applied at any given instant in a mutually exclusive manner to said loads such that said load-energizing voltage is applied to only one of said loads at any given instant, said D.C. power supply and said switch means comprise means for delivering different polarities of said load-energizing voltage to said loads, and said loads comprise polarity-sensitive means for rendering one of them responsive to only a particular one of said polarities of said load-energizing voltage and the other of them responsive to only a particular other of said polarities of said load-energizing voltage.

37. In an automotive vehicle signal lamp system which comprises respective right and left signal lamp loads of given continuous D.C. voltage and illumination ratings on respective right and left sides of a vehicle for providing visible signals on the right and left sides of a vehicle, a D.C. power supply for energizing said lamp loads, and circuit means operatively coupling said D.C. power supply with said lamp loads, said circuit means including switch means for selectively energizing said lamp loads from said D.C. power supply to produce said signals, the improvement which comprises control logic means for operating said switch means in accordance with signal command inputs to said control logic means to cause said lamp loads to produce different signals corresponding to different signal command inputs, priority according means for according a predetermined priority to said different signal command inputs such that said lamp loads are caused to exhibit the signal commanded by the highest priority signal command which is being input to said control logic means, and in which said signal command inputs include, in decreasing order of priority, hazard warning, right and left turn, and brake lamp commands, and said control logic means comprises means for controlling the operation of said switch means in a particular manner for each command, in which said priority according means comprises plural logic gates which, from those command signals being received by said control logic means, transmit to said switch means the one command signal which has the highest priority, and in which said logic gates comprise a first set of gates associated with one of said lamp loads and a second set of gates associated with the other of said lamp loads, said hazard warning signal command input being provided through a hazard warning switch to one particular input of both sets of gates, said right and left turn signal command inputs being provided through a turn signal switch selectively to both sets of gates, the right turn signal command to said one particular input of said first set of gates and the left turn signal command to said one particular input of said second set of gates, and said brake command input being provided through a brake switch to another particular input of both sets of gates, and in which said command signal inputs further include a running lamp command input which has a priority lower than the first-three-mentioned command signal inputs, and the running lamp command signal input is provided to both said sets of gates and is conjointly developed by means of respective park and interrupt switches which operate through an EXCLUSIVE OR gate on said control logic means such that said running lamp command signal is transmitted to both said sets of gates only if either one, but not both, of said park and interrupt switches is actuated.

* * * * *